Figure 1:
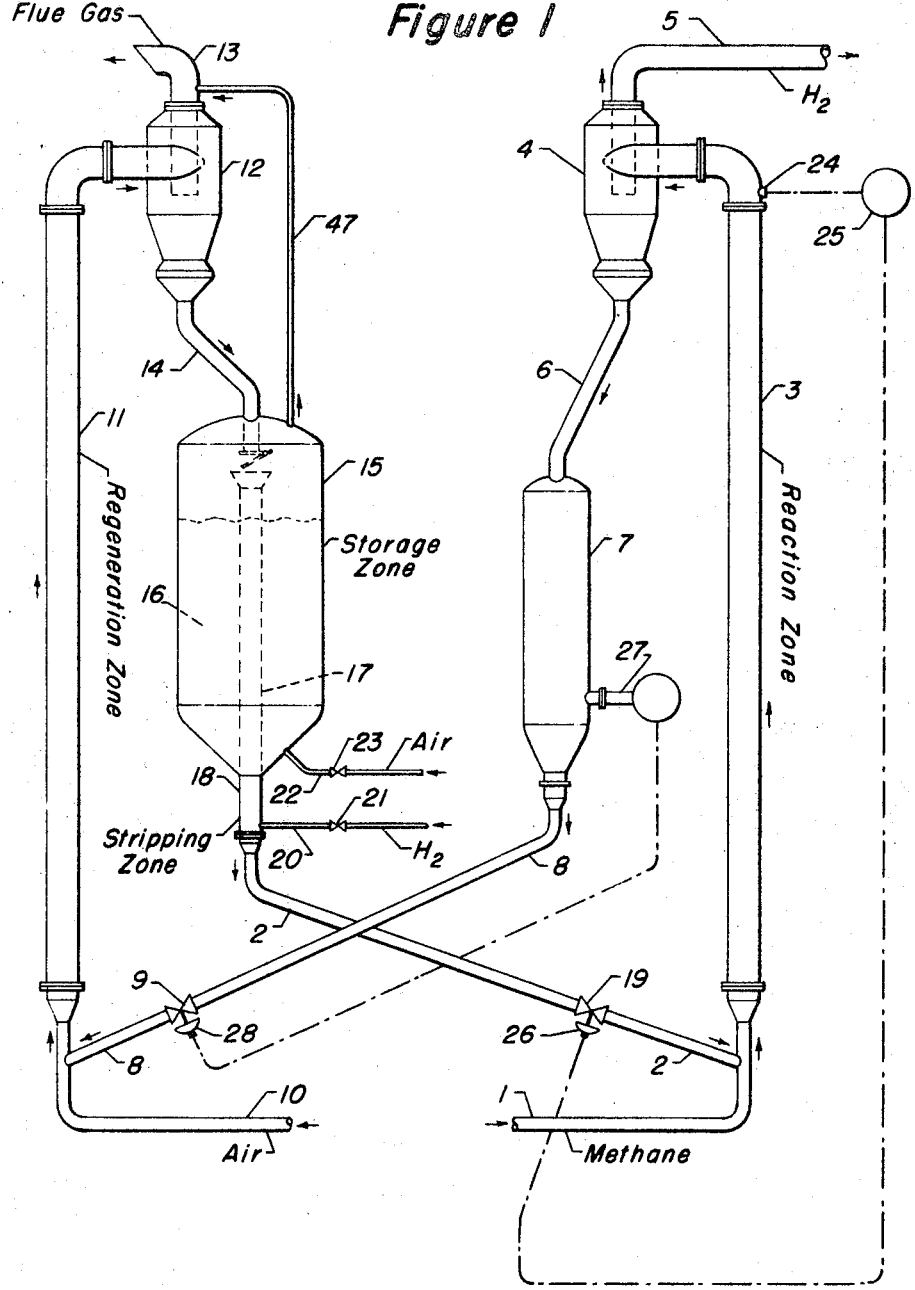

INVENTOR:
Donald H. Belden

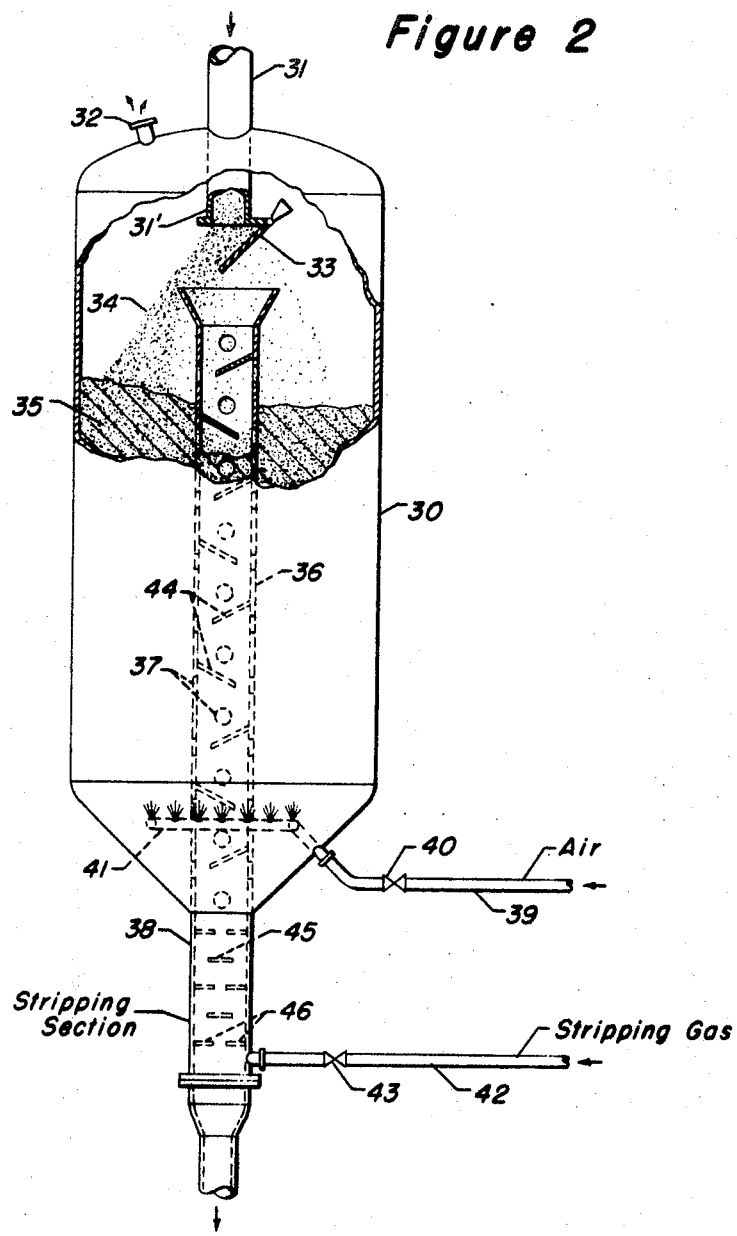

United States Patent Office 3,208,831
Patented Sept. 28, 1965

3,208,831
APPARATUS FOR STORING AND STRIPPING CATALYST IN A FLUIDIZED SYSTEM
Donald H. Belden, Prospect Heights, Ill., assignor to Universal Oil Products Company, Des Plaines, Ill., a corporation of Delaware
Filed July 31, 1961, Ser. No. 128,046
3 Claims. (Cl. 23—288)

The present invention is directed to a method and apparatus for storing and stripping catalyst in a fluidized system and more particularly to a novel arrangement which maintains a catalyst inventory in a system which does not make use of a dense phase bed in either the reaction or regeneration zones of the system.

The more common or conventional fluidized systems have been operated in a manner which do make use of a relatively dense phase bed in either, or both, the reaction and regeneration chambers. In other words, there has been a zone wherein the quantity of catalyst particles is high as compared to the fluidizing medium such that the particles are in a state of "hindered settling" similar in nature and appearance to a boiling liquid. Such dense phase beds have generally been of sufficient depth that they have provided a substantial quantity of inventory within the system and have thus permitted various depth beds with varying quantities of catalyst in active circulation. However, in a fluidized system which operates with entirely dilute or light phase contacting in both the reaction and regeneration zones, there is a necessity for building into the unit some catalyst storage or inventory such that there may be rapid adjustment in the rate of catalyst circulation throughout the entire system, or in any one portion of the system.

Thus, a principal object of the present invention is to provide a simple and rather inexpensive means for storing catalyst particles for continuous use in a dilute phase system.

It is a further object of the invention to provide a combination stripping and storing means for efficient use in a fluidized catalyst system.

It is a still further object to provide a non-mechanical arrangement which permits the gravity feed of particles from a storage zone to a stripping zone for varying levels in the storage zone and for varying circulation rates.

The term "dilute phase" or "light phase," as used herein, refers to a fluidized particle phase in which there exists a relatively small quantity of solids with respect to the quantity of gaseous or vaporous stream being introduced into the particular zone and there is a resulting concurrent flow of the solids with the fluidizing stream.

The continuous fluidized catalytic cracking of a methane or natural gas feed stream to form hydrogen and carbon is one example of a conversion operation which may be advantageously carried out in a dilute phase with the use of elongated restricted diameter reaction and regeneration zones. Heated catalyst particles are passed from a heating and regenerating zone into admixture with the feed stream and are then carried upwardly in a dilute phase condition through an elongated narrow reaction zone to effect the cracking of the methane into hydrogen and carbon. Contacted catalyst particles collected from a subsequent separation zone are caused to commingle with an air stream and pass through a regeneration zone where carbon is burned therefrom while rising in a fluidized dilute phase contact. There is removed at least a portion of the carbon deposit to provide a desired carbon level, and at the same time there is effected the reheating of the catalyst to a desired temperature level. In order to preclude carbon oxides (CO and $CO_2$) from passing to the reaction zone to in turn reduce the efficiency of the cracking operation, it has been found desirable to strip such oxides from the catalyst particles prior to returning them to the reaction zone. Also, as hereinbefore set forth, in order to provide flexibility in catalyst circulation rates in a continuously operating unit, it is desirable to have a storage zone for some readily available catalyst inventory in such unit or system. Still further, as will be hereinafter set forth in more detail, there is provided an operation wherein the catalyst particles being introduced last to such storage zone are the first out for transfer to a subsequent contact zone.

In one embodiment, the present invention comprises in combination with a fluidized system, having subdivided solid particles contacted successively in separate contacting zones, the improved method of maintaining a catalyst inventory in the system and the stripping of such particles prior to their being transferred to a succeeding zone in a manner which comprises, passing the contacted particles into a non-fluidized bed maintained within a vertically elongated confined storage zone, withdrawing catalyst particles in a gravity flow from the upper portion of said non-fluidized bed, into a vertical columnar stripping zone having vertically spaced passageway means in communication with and extending vertically along and adjacent to the storage zone, and effecting the descending fluidized flow of the withdrawn particles countercurrent to a stripping medium being introduced into the lower end of said columnar stripping zone, and withdrawing resulting stripped particles from the lower end of said stripping zone.

In another embodiment, the present invention provides a catalyst stripping-storing apparatus which comprises in combination, a confined vertically elongated chamber, a perforate walled catalyst withdrawal section of substantially lesser cross-sectional area than said chamber extending vertically throughout substantially the major portion of the interior of the chamber, the withdrawal section connecting to and being coextensive with a non-perforate catalyst stripping section extending from the lower portion of said chamber, a catalyst inlet and a gas outlet connecting with the upper portion of the chamber, and a catalyst outlet and a stripping gas inlet connecting with the lower end of the catalyst stripping section.

In a preferred apparatus arrangement the catalyst inlet to the upper portion of the storage chamber is provided with suitable check valve means which will permit the downward flow of catalyst particles while substantially precluding the upward flow of a stripping gas into such catalyst outlet line. Also, the catalyst inlet is preferably positioned such that the bulk of the discharged particles pass directly to the storage section of the chamber and not directly into the withdrawal line. Thus, the subsequent flow of particles will be from the upper portion of the particle bed into the perforate walled withdrawal section in a manner permitting the level of the catalyst inventory in the storage section to vary in accordance with the desired catalyst circulation rate.

Reference to the accompanying drawings and the following descriptions thereof will serve to further amplify and clarify the present improved means for storing and stripping catalyst particles in a fluidized system which does not make use of dense phase beds in the contacting zones.

FIGURE 1 of the drawing is a schematic flow diagram indicating a dilute phase fluidized contacting system which makes use of the combination storage-stripping means in combination therewith.

FIGURE 2 of the drawing shows an enlarged elevational view, partially in section, of one embodiment of an improved particle storage-stripping apparatus for use in a fluidized particle contacting system such as indicated in FIGURE 1.

Referring now to FIGURE 1 of the drawing, there is illustrated for convenience in description, a unit which may be used advantageously in the cracking of a methane or natural gas stream to provide high yields of hydrogen. The methane containing stream is introduced by way of line 1 into contact with high temperature catalyst particles from line 2 and the mixture moves upwardly in dilute phase condition through the reactor 3. The temperature of the catalyst particles received from line 2 is generally above about 1200° F. and the contacting time in the upwardly flowing dilute phase stream in reactor 3 is sufficient to provide a high conversion of methane to hydrogen. In other words, primarily hydrogen and carbon comprise the product stream. The hydrogen product stream from reactor 3 passes overhead into a separator 4, which in turn effects the discharge of the hydrogen, by way of line 5, substantially free of catalyst particles. Separated particles pass from separator 4 downwardly through line 6 into an enlarged zone 7, and thence into standpipe line 8 and through control valve 9. The cracking operation in the reaction zone 3 is highly endothermic such that there is a substantial loss of heat from the catalyst particles in the conversion step. Thus, the resulting cooled and carbonized particles reaching line 8 from the reaction zone 3 are necessarily passed into contact with an air stream being introduced through line 10. The air-catalyst mixture then passes upwardly in a dilute phase contact through regenerator 11 whereby carbon may be burned, at least in part, from the catalyst particles and the latter reheated to a desired high temperature level sufficient to in turn provide the desired endothermic heat for the conversion in the reaction zone 3. The regeneration zone 11 is indicated as being confined in an elongated pipe-like chamber, similar to the reaction chamber 3, such that the entire contact is carried out in a dilute phase with all of the catalyst particles being carried overhead into a particle separator 12. The latter effects the separation of a substantially particle free flue gas stream, which is discharged through line 13, and a descending stream of separated particles through line 14. The latter connects with and discharges into the upper end of a storage chamber 15. Chamber 15 is of an enlarged diameter permitting the collection of catalyst particles in a variable level quiescent bed 16, which in turn provides some quantity of catalyst inventory in the system. In other words, at any particular time that the catalyst circulation rate is decreased there will be a higher level for bed 16 while on the other hand, if it is desired to increase the catalyst circulation rate the level of bed 16 may be permitted to decrease.

Internally within storage chamber 15 is a perforate walled tubular section 17 which in turn connects with and is coextensive with a lower stripping section 18 that extends from the end of storage chamber 15 to the catalyst standpipe 2 having control valve 19. Hydrogen, or other suitable stripping medium, is introduced into the lower end of stripping zone 18 by way of line 20 and control valve 21 such that there may be effected the stripping and removal of entrained carbon oxides from the descending stream of catalyst particles.

The present drawing also indicates means for introducing additional air or oxygen into the lower portion of the storage zone by way of line 22 and valve 23 such that it is possible to effect some degree of additional oxidation and removal of carbon from the particles in bed 16 within the chamber 15. However, the operation of the storage-stripping means depends primarily upon a quiescent bed 16 and the introduction of air through line 22 is necessarily effected in a manner precluding fluidization of bed 16. A vent line 47 provides for passing flue gas and used stripping gas from the top of chamber 15 to the flue gas line 13. The perforate withdrawal section 17 provides for direct lateral communication with the catalyst bed 16 whereby there may be a continuous gravity flow from the latter into the interior of the section 17 and to the stripping section 18 for subsequent passage to the standpipe 2. It has been found that finely divided catalyst particles, especially when in a substantially spherical form, will readily flow laterally into the withdrawal section 17 from bed 16 even though there may be an upward flow of gas through the stripping section 18 and through the perforate withdrawal section 17. Further it has been found that the rate of withdrawal of catalyst particles from the bed 16 into the stripping zone and to the standpipe 2 may be controlled and varied in accordance with the adjustment of the control valve 19 so as to establish any desired circulation rate in the system. The level of the bed varies upwardly and downwardly in accordance with the adjustment of valve 19 and the quantity of catalyst in active circulation.

It is not intended to limit the present method of stripping and storing of catalyst to the use of any one type of catalyst or composition, inasmuch as such composition may be prepared and/or finished to suit any particular type of conversion in a fluidized system. Further, even though the present drawing indicates a methane cracking and hydrogen producing operation, it is not intended to limit the present control system for use in any one conversion. The catalyst particles themselves shall, however, be preferably of a spherical nature in the form of "micro" and "macro" spheres or of such size that the particles may be handled in a fluidized manner as required in the vertical contacting zones 3 and 11.

Varying means may be used for controlling the rate of circulation in the system and it is not intended to limit the operation to any one set of controls. For convenience in completing the diagrammatic embodiment, a control system is shown which makes use of a temperature sensitive means 24 at the top of reaction section 3, which in turn connects through a temperature controller means 25 to a motor operating means 26 at control valve 19. Thus, a varying temperature catalyst and product stream in connection with reaction zone may be used to in turn vary the flow of hot catalyst through line 2 into contact with the feed stream from line 1 and the resulting mixture carried in a dilute phase manner through reaction chamber 3. At the same time, a level control means 27 is indicated as connecting with the enlarged zone 7 above standpipe 8 such that there may be control of the flow-through valve 9 and line 8. In other words, level controller 27 connects with the motor operating means 28 of valve 9 such that the latter operates responsive to variations in the quantity of catalyst particles passing downwardly from separator 4 to standpipe 8 for subsequent transfer into the regeneration zone 11.

Referring now to FIGURE 2 of the drawing, there is indicated diagrammatically one embodiment of a combined storage-stripping apparatus such as may be used in connection with a dilute phase or light phase fluid operation of the type set forth in connection with FIGURE 1. An enlarged diameter vertical chamber 30 is provided with a vertical inlet 31 and a gas outlet 32 at the upper end portion thereof. The inlet line 31 has an inner extension 31' which in turn is provided with a weighted flapper valve 33 permitting the downflow of catalyst particles 34 into a substantially stationary bed 35. The balanced flapper type valve 33 operates as a check valve, permitting the downflow particles while precluding the upflow of a gaseous stream into inlet line 31. Other types of suitable check valves may, of course, be utilized in connection with the apparatus in lieu of the pivoted type of valve shown.

A centrally positioned conduit-like member 36 is provided with a plurality of vertically spaced openings 37 such that catalyst particles from the bed 35 will pass into the interior of the withdrawal conduit 36 and pass downwardly therethrough to a stripper section in the lower portion thereof and into the coextensive small diameter stripping section provided by the external section 38. The holes or openings 37 may be of various shapes and sizes but, of course, should be sufficiently large to readily pass the particulated material into the withdrawal zone. Also, the openings are preferably spaced such that the lower end of one opening approaches or overlaps the upper end of the next lower opening such that particles from the upper surface of bed 35 will have an access opening readily available to pass particulated material into the withdrawal zone, regardless of the location of the top of the bed in the chamber 30.

An air or treating gas inlet line 39, with valve 40, is shown as connecting with the lower portion of the storage section of the confined chamber 30 such that a treating gas may be introduced through a distributing line 41 into the lower portion of the bed 35. Such air or treating gas stream may be used to further treat the particles as, for example, to effect the removal of a greater quantity of carbon from carbonized catalyst particles or alternatively to effect additional stripping of occluded gaseous or vaporous materials. However, as pointed out hereinbefore, any introduction of air or gas from line 39 into the lower portion of the chamber should be at low velocity precluding any fluidization of the settled particle bed 35 such that a gravity flow is readily obtainable from the upper portion of the bed into withdrawal conduit 36.

The particulate material passing downwardly through withdrawal conduit section 36 and stripping section 38 is caused to pass countercurrently to an upwardly flowing gaseous stream which may be introduced through line 42 and valve 43 at the lower end of stripping section 38. Increased turbulence and countercurrent stripping is enhanced within the withdrawal section 36 and stripping zone 38, by a plurality of vertically spaced baffle plates. Side to side type plates 44 are shown in section 36 while disc and donut type of baffle plates 45 and 46 are indicated in the stripping zone 38. Various types of baffling may, of course, be utilized in connection with the apparatus and it is not intended to limit the invention to any one particular arrangement.

The present embodiment utilizes a centrally positioned round withdrawal conduit section 36 such that the bed 35 is of an annular shape surrounding the central conduit, however, in an optional structural arrangement, a perforate-wall withdrawal section such as 36 may be rectangular, rather than round, and may be positioned along one side of the interior of chamber 30 such that the particle bed does not necessarily entirely surround the withdrawal conduit. Also, the catalyst inlet should preferably be arranged and positioned to build up a substantially uniform level in the storage bed maintained within the chamber 30 in order to permit uniform distribution and flow by gravity into the catalyst withdrawal sections while at the same time precluding direct flow of any quantity of catalyst particles downwardly into the vertical withdrawal and stripping sections.

It has also been determined, as set forth hereinbefore, that with the proper arrangement and sizing of the openings 37 in the withdrawal conduit and the controlled introduction of stripping gas upwardly through the stripping and withdrawal sections 38 and 36 there is very little bypassing of particles from the lower portion of bed 35 into the conduit 36 and substantially all of the withdrawal takes place from the upper portion of bed 35. Thus, the quantity or inventory of the particles in chamber 30 and the resulting upper level of bed 35 varies during the continuous operation of the unit in accordance with varying circulation rates established in the fluidized system by the regulation of the control valves in such system. An advantage in the present improved stripping-storage unit is, of course, the improved means for making available an excess quantity of particulated material in the system without the use of dense phase beds in the contacting zone, while at the same time permitting flexibility in the overall system to make rapid adjustments in the heat balance of the unit by virtue of varying catalyst circulation rates.

Still another distinct advantage obtained by the design of the stripping-storage unit is the fact that the same catalyst particles are kept in more or less constant use, i.e. those particles which are last introduced into the unit are those which are at the top of the bed 35 and are thus the first to flow into the withdrawal section 36 for recirculation in the system. For example, in the cracking of methane to produce a high yield of hydrogen, it is desirable to closely regulate the carbon level on the catalyst and at the same time, of course, maintain a desired carbon monoxide to carbon dioxide ratio in the regeneration zone. In this improved system, a change in the carbon burning rate in the regeneration zone and the carbon level on the catalyst is rapidly reflected in the reaction zone since the more recently contacted particles will flow from the top of the bed in the storage zone to the reaction zone. The remaining catalyst inventory may be modified gradually and as may be necessary to effect a desired carbon level as the circulation rate is varied, or as may be accomplished by the introduction of air into the lower end of the bed through air line 39.

I claim as my invention:

1. In an apparatus for the contacting of fluids with fluidized subdivided solid catalyst particles successively in a reaction chamber and a regeneration chamber, the combination of a confined vertically elongated storage chamber, means for passing solid catalyst particles from said regeneration chamber into the upper portion of said storage chamber and for maintaining a quiescent bed of catalyst particles in the storage chamber, a perforate-walled particle withdrawal section of substantially lesser cross-sectional area than said storage chamber extending vertically throughout substantially the major portion of the interior of the storage chamber, said withdrawal section connecting to and being co-extensive with a non-perforate particle stripping section extending from the lower portion of the storage chamber, a gas outlet connecting with the upper portion of the storage chamber, a stripping gas inlet connecting with the lower end of said stripping section, and means for passing stripped catalyst particles from the lower end of said stripping section to said reaction chamber.

2. The apparatus of claim 1 further characterized in the provision of vertically spaced baffles within said stripping section.

3. The apparatus of claim 1 further characterized in the provision of vertically spaced baffles within said stripping section and said withdrawal section.

References Cited by the Examiner

UNITED STATES PATENTS

| | | | |
|---|---|---|---|
| 2,530,645 | 11/50 | Bockman | 23—288.3 |
| 2,541,186 | 2/51 | Anderson | 23—288.3 |
| 2,548,026 | 4/51 | Kaasa | 23—288.3 |
| 2,929,774 | 3/60 | Smith | 23—288.3 |

MAURICE A. BRINDISI, *Primary Examiner.*